Figure 1:
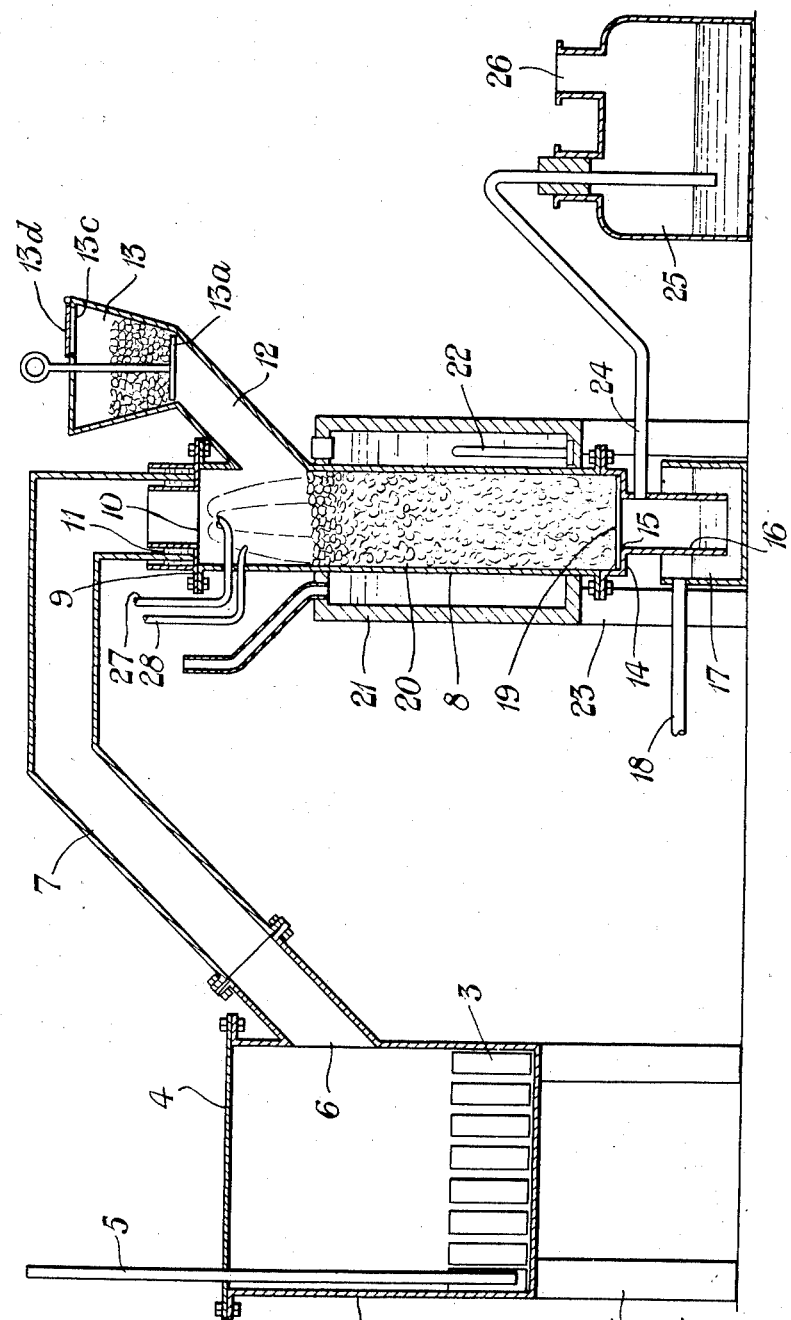

Jan. 8, 1952     T. CRITCHLEY     2,581,518
OXIDATION OF NITROGEN OXIDE FUMES
Filed Feb. 17, 1948     2 SHEETS—SHEET 1

Inventor
Thomas Critchley
By his attorneys
Howson and Howson

Patented Jan. 8, 1952

2,581,518

UNITED STATES PATENT OFFICE 2,581,518

OXIDATION OF NITROGEN OXIDE FUMES

Thomas Critchley, Brimsdown, Enfield, England, assignor to Johnson & Sons' Smelting Works Limited, Enfield, England, a British company Application February 17, 1948, Serial No. 8,823
In Great Britain March 8, 1946

Section 1, Public Law 690, August 8, 1946
Patent expires March 8, 1966

10 Claims. (Cl. 23—102)

This invention relates to chemical reactions which result in the evolution of brown fumes of oxides of nitrogen such as the reaction of nitric acid on an element, such as any of the metals, silver, copper, lead, mercury, bismuth and the like, or selenium, and is particularly concerned with the means for the disposal of the brown fumes of oxides of nitrogen evolved.

The usual method of disposing of such brown fumes consists in conveying them in a draught of air through absorption towers containing water, whereby the oxides are oxidised and dissolved in the water to give a weak nitric acid solution. Generally speaking the reaction is slow and a number of absorption towers is needed.

It would appear that the efficient absorption of oxides of nitrogen is influenced by temperature, concentration and velocity of the gases passing through the towers, and that, therefore, if the concentration were high and the velocity low, a much higher efficiency would be obtained than under normal working conditions.

Included in the reactions to which this invention relates is the manufacture of metallic nitrates and more particularly the production of silver nitrate or bismuth nitrate by the reaction of nitric acid with metallic silver or bismuth. The reaction involved proceeds, according to the literature, in a series of steps of which the net result may be expressed, for example in the case of metallic silver, by the following equation:

$$4Ag + 6HNO_3 = 4AgNO_3 + NO + NO_2 + 3H_2O$$

From this equation, it is obvious that one third of the nitric acid employed is converted into nitric oxide and is lost as far as the formation of silver nitrate is concerned. In contact with air, nitric oxide is converted to nitrogen tetroxide ($N_2O_4$) and this in turn reacts with nitric oxide to give nitrogen trioxide ($N_2O_3$). In the presence of water, there is formed from these oxides by condensation a mixture of nitrous and nitric acids which is highly corrosive. Considerable expense is incurred in providing the absorption towers needed for condensing these oxides and for disposing of the dilute acid formed.

A principal object of this invention is to provide an improved method of absorption by means of which the desirable high concentration and low velocity of the oxide fumes are obtained.

A further object is to provide a method of absorption in which oxygen or a gas consisting mainly of oxygen is employed instead of air.

Another object of the invention is to provide a process of regenerating the nitrate radicle from the nitrogen oxide fumes evolved during a chemical reaction, such as the reaction of an element with nitric acid in which the oxides are brought into contact with oxygen or a gas consisting mainly of oxygen and a thin film of an aqueous liquid, such as water, lime water or caustic alkali, which forms a solvent for the said oxides.

A still further object is to enable the oxides of nitrogen to be recovered in the form of nitric acid or of the nitrate of the metal undergoing the reaction in which the said oxides are evolved.

Another object of the invention is to provide a process in which the formation of brown fumes of oxides of nitrogen is reduced to a minimum.

Another object is to ensure that a greater proportion of the nitric oxide involved in the reaction is utilized than has been the case with hitherto known processes.

Another object is to obviate the necessity of providing expensive and cumbersome apparatus for disposing of the brown fumes evolved and enable the entire reaction to be carried out with the use of simple apparatus which occupies a relatively small space. A related object is to provide simple and compact apparatus for carrying out the improved process.

Another object is to provide a process by which the metal undergoing the reaction is continuously coated in an atmosphere of oxygen or a gas consisting mainly of oxygen with a thin film of nitric acid such that the acid and oxygen come together into close contact with substantially the whole of the exposed surface of the metal and by regulation of the rate of flow of the acid over, or the period of contact thereof with, the metal or both, to utilise substantially the whole of the acid in forming the nitrate.

The manner in which the above and other objects are attained, in accordance with the invention will be more readily understood from the following detailed description taken in conjunction with the accompanying drawings.

Figure 2:
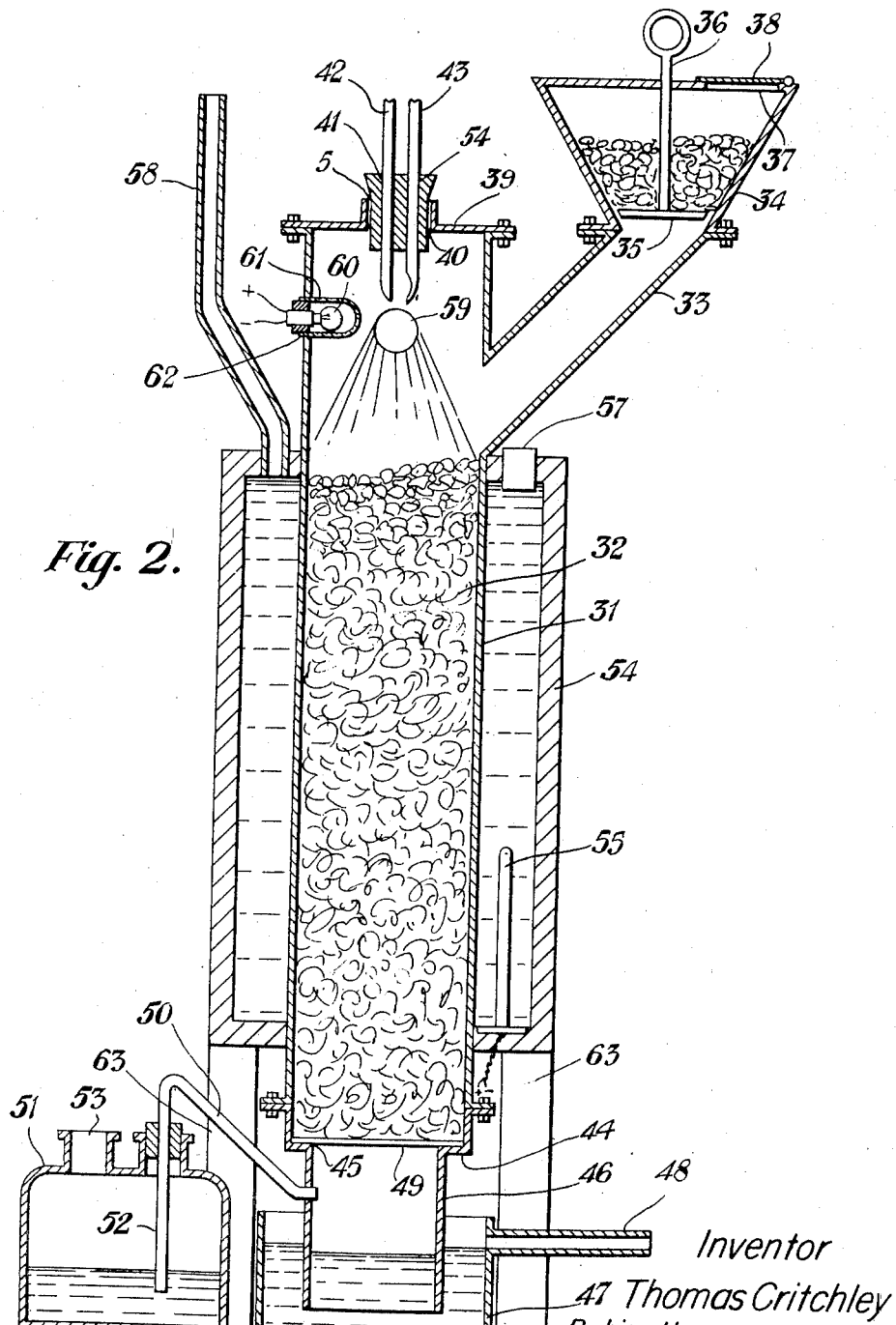

Fig. 1 diagrammatically shows apparatus for regenerating the nitrate radicle from the nitrogen oxide fumes, said fumes being evolved in a separate vessel by the reaction of metallic bars with nitric acid;

Fig. 2 shows apparatus for employing the invention as applied to the manufacture of silver nitrate by the reaction of nitric acid on metallic silver.

Referring to the drawing, the apparatus consists of a pan or cauldron 1, for example of stainless steel, mounted on supports 2, and containing bars 3 of metallic silver to be treated with nitric acid. The pan 1 is provided with a cover plate 4, through which passes a pipe 5 for the introduction of the nitric acid, the said pipe extending nearly to the bottom of the pan 1 so as to bring the fresh acid into direct contact with the metal 3 when the pan contains a large amount of the heavier silver nitrate solution in the later stages of the process. Any suitable means not shown in the drawing may be provided for heating the pan.

Near the upper end of the pan 1 is provided an aperture 6 from which aperture extends a pipe or conduit 7 to the upper end of a vertical closed vessel or absorption tower 8, also of stainless steel. The tower 8 is provided with a cover plate 9 having an aperture 10 and a water-seal 11.

The absorption tower is provided, near the upper end, with a branch pipe 12 opening to a hopper 13 for feeding in granular silver to the tower 8. The feed hopper 13 is closed at its lower end by a disc 13a secured thereto. The top of the hopper 13 is closed except for an aperture 13c, itself closed by a hinged flap 13d.

The bottom of the tower is inwardly flanged at 14 to provide an aperture 15 opening to a tubular extension 16 projecting into a collecting vessel, or receptacle 17, for the nitrate solution formed, and which is provided with an overflow pipe 18. The aperture 15 is covered by a perforated or meshed disc 19 on which rests granular or nodular metal 20, in this case metallic silver.

A water jacket 21 surrounds, and may be welded to, the tower 8 for the purpose of initially heating the granular material to a predetermined temperature of say 65° C., the temperature of the water being regulated by means of a thermostatically controlled immersion heater 22. The tower 8 and the water jacket 21 are mounted on supports 23.

From the interior of the aforesaid tubular extension 16 above the collecting vessel 17 extends a tube 24 leading to a manometer 25, the end of the said tube being immersed in water in the manometer 25, which is open to the atmosphere at 26.

A pipe 27 extends into the upper part of the tower 8 for the introduction of water, and a second pipe 28 for the introduction of oxygen.

In the use of the apparatus, in accordance with the invention, the pan 1 is charged with silver in the form of bars 3 and nitric acid is introduced through the pipe 5. The silver reacts with the nitric acid, forming silver nitrate with the evolution of oxides of nitrogen. The temperature of the pan or cauldron 1 is such that a continuous boiling of the liquid takes place. The nitrogen oxides evolved pass through the conduit 7, and enter the tower 8, where they are mixed with oxygen, introduced through the pipe 28, and the mixture is sprayed with water issuing through the pipe 27.

The absorption tower being, as stated above, charged with a column of granular silver 20, heated to the required temperature, the oxides of nitrogen, oxygen and water together react with the silver, while passing down through the tower 8, and the silver nitrate solution, so formed, collects in the collecting vessel 17 and is withdrawn through the overflow pipe 18. The supply of oxygen to the tower 8 is adjusted so that practically no gas bubbles through the manometer 25. Any bubbles, which may arise, will consist of oxygen, the whole of the oxides of nitrogen having been converted into nitric acid, which reacts with the metallic silver to form silver nitrate.

Fresh silver may be introduced through the hopper 13 to replace that used up in the reaction.

It is to be understood that, although in the above, the tower 8 has been described as being filled with metallic silver and the nitrate radicle recovered in the form of silver nitrate, the tower may, if desired, be filled with an inert granular or nodular material, such as coarse-grained quartz or porcelain, in which case nitric acid will be collected in the vessel 17.

Moreover, the process and apparatus according to the invention may equally well be utilised in connection with any other reaction giving rise to the formation of brown fumes of nitrogen oxides in contact with air.

Referring now to Fig. 2 of the drawing, a tower 31 for containing the granular silver 32 is provided, near the upper end, with a branch pipe 33 opening to a hopper 34 for feeding in the metal, the said hopper being closed at its lower end by a disc 35, which may be raised or lowered by a handle 36 secured thereto. The top of the hopper is closed except for an aperture 37, itself closed by a hinged flap 38.

The upper end of the tower 31 is closed by a cover 39 provided with an aperture 40 closed by a plug 41 through which extend two tubes or nozzles 42 and 43 for supplying oxygen and nitric acid respectively to the interior of the tower 31.

The bottom of the tower 31 is inwardly flanged at 44 to form an aperture 45 opening to a tubular extension 46 projecting into a collecting vessel or receptacle 47 for the nitrate solution formed, and which is provided with an overflow pipe 48. The aperture 45 is covered by a perforated or mesh-form disc 49 on which the metal rests.

A pipe 50 leads from the interior of the extension 46 above the collecting vessel 47 to a manometer 51, the end 52 of the tube being immersed in water in the manometer, which is open to the atmosphere at 53.

A water jacket 54 surrounds, and may be welded to, the tower 31, for initially heating the material 32 to a predetermined temperature, the water being heated by means of a thermostatically controlled immersion heater 55. 57 is a plug closing a filling opening for the jacket 54. 58 is a condenser tube to allow of condensation of water vapor.

The wall of the tower 31 is provided with an observation window 59, illuminated by means of an electric bulb 60 housed in a glass tube 61 mounted in an aperture 62.

The whole apparatus is mounted on supports 63.

In carrying out the process according to the invention, as applied to the formation of silver nitrate solution by means of the above described apparatus of Fig. 2, the tower 31 is filled to the level of the lower end of the branch pipe 33 with granulated silver 32, air is displaced by admitting oxygen through the aforesaid tube 42 and the water jacket 54 is heated to the appropriate temperature by means of the immersion heater 55.

Nitric acid is then introduced in a regulated stream through the other tube or nozzle 43. As it leaves the nozzle 43, it is converted into a spray by the impingement thereon of the entering oxygen. The spray may be observed through the observation window 59 and any necessary adjustments made to produce the optimum conditions. Little, if any, brown fumes are to be observed. As the mixture of nitric acid and oxygen pass down through the column of silver 32, the latter is converted into a solution of silver nitrate which collects in the receiving vessel 47 and runs off through the overflow pipe 48 for evaporation. Excess oxygen passes through the pipe 50 to the manometer 51 and can be observed through the water therein. The supply of oxygen can be regulated until the amount of oxygen leaving through the pipe 50, leading to the manometer, is very small, say one bubble every few seconds. While the reaction can be carried out at atmospheric pressure, i. e. with no gas leaving this pipe, this is not recommended, as there is then the possibility that water may run back into the depending extension 46 of the tower 31 through the said pipe 50. I, therefore, prefer to work at a pressure very slightly above atmospheric pressure. The gas leaving the manometer 51 is quite odorless and colorless, indicating that there are no objectionable nitrogen oxides present. The reaction being exothermic, no further heat need be supplied; in fact it may be found necessary to cool the tower by introducing cold water into the jacket.

The column of metal should, preferably, be of such a length that the reaction is complete when the liquid has traversed the whole of the column. By providing a column of suitable length and by maintaining it at a temperature within the limits specified above, it is possible to obtain continuously at the bottom of the column of metal in the tower a nearly neutral, saturated solution of the metal nitrate without more than a trace of brown fumes of nitrogen tetroxide being produced at any stage of the process.

If air, instead of oxygen, be supplied through the aforesaid inlet tube 42 to the tower 31, copious brown fumes may be observed through the window 59, which fumes will also escape to the manometer 51 and the concentration of the silver nitrate solution leaving via the overflow pipe 48 is appreciably lower.

With the above apparatus I may use a column of granulated silver, 6" in diameter and about 3' high (but not less than 2' 6") the water bath being maintained at 65° C. enabling the column of silver to be preheated to that temperature. If the silver column is maintained at a lower temperature than about 65° C., the resulting solution of silver nitrate will still be nearly neutral, but will contain appreciable amounts of silver nitrite. If the temperature is allowed to rise to 100° C., a small quantity of nitrogen oxides is produced by the reaction. The total weight of silver in the column 32 is then about 2,600 oz. troy. The nitric acid is allowed to drop in through the tapered tube 43 at the rate of 167 cc. of nitric acid per minute, the nitric acid having a specific gravity 1.27 preferably. The rate of flow of the acid should not exceed about 320 cc./hr./sq. in. of surface area of the silver column. The oxygen nozzle 42 is so arranged that the gas plays on to the falling stream of acid and converts it into a fine spray which is evenly distributed over the upper surface of the metal column 32. As the silver in the tower 31 dissolves, more silver is added from the feed hopper 34 through the aforesaid branch 33. The silver dissolves at the rate of 300 oz. troy/hr. giving a silver nitrate solution of specific gravity 2.0, which contains 42% of silver by weight and not more than 1 grm. of free nitric acid/litre. This solution can be passed directly to the evaporators for concentration to obtain silver nitrate crystals. The yield of silver nitrate, based on the amount of nitric acid passing through the column of metal, is more than 99% of the theoretical, assuming that all the nitric acid is converted into silver nitrate without the formation of any brown fumes. Apparently reaction takes place according to the equation

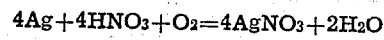

$$4Ag + 4HNO_3 + O_2 = 4AgNO_3 + 2H_2O$$

From this it will be seen that no nitric acid is lost as brown fumes, substantially the whole being converted into silver nitrate, thus effecting an economy of at least 33% of nitric acid compared with existing processes. In addition the reaction can be carried out without the necessity of installing any plant for scrubbing the effluent gases to remove noxious fumes and without forming any weakly acid byproducts for disposal.

Although in the above the manufacture of silver nitrate has been described, it is to be understood, that, by substituting metalic bismuth for the metallic silver in the tower, bismuth nitrate will be obtained. In this case, however, it may be found advisable to use a shorter column of metal so that the effluent solution is sufficiently acid to prevent possible hydrolysis of the bismuth nitrate with the production of insoluble basic bismuth nitrate.

Moreover, while in the above example, I have described the tower as containing granular silver, it is to be understood, that the metal may, if desired, be in other than granular or nodular form, for example in the form of bars, the length of the column being so co-related to the rate of flow of the acid thereover that the reaction is substantially complete when the liquid has traversed the whole of the column.

Whilst, in the above, examples of the manner in which the invention may be carried out has been described, it will be appreciated by those skilled in the art that modifications may be made therein without departing from the spirit and scope of the invention as defined by the appended claims.

In my co-pending application Serial No. 8,825 filed February 17, 1948, is disclosed a process for the manufacture of the nitrate of a metal giving rise to the evolution of higher oxides of nitrogen on reaction with nitric acid. In that process, maximum utilisation of the acid employed in the reaction is obtained by ensuring prolonged contact of the acid with the metal, by delaying the passage of the acid over a column of bar metal, and at the same time reconverting in the reaction zone any nitrogen oxide fumes evolved by means of oxygen and the total exclusion of air, the rate of evolution of oxide fumes being kept constant by ensuring continuous removal of the nitrate solution formed from the scene of the reaction, whereby the oxygen supply can be regulated to the amount required. By this means it is possible, whether granulated or bar metal is used, to obtain utilisation of substantially the whole, if not the whole, of the acid, employed in the reaction, in directly forming the nitrate, thereby effecting a considerable savings in the cost of the process.

The present invention is concerned with the disposal of nitrogen oxide fumes from whatever source they may have been obtained, the final form which the recovered nitrate radicle takes being of entirely secondary consideration.

This application is a continuation-in-part of my copending application 8,824, filed February 17, 1948, now abandoned.

What I claim is:

1. A process for effecting total absorption of the nitrogen oxide fumes evolved during a chemical reaction which comprises flowing the oxide fumes at their normal velocity of evolution continuously through a closed vessel containing a column of material presenting large surface areas of contact, air being totally excluded from said closed vessel and the system being maintained at substantially atmospheric pressure; simultaneously introducing into said closed vessel a continuously renewed trickle of a gas, consisting substantially entirely of oxygen, and an aqueous absorbing liquid; regulating the rate of supply and the velocity of flow of the oxygen gas to and through the closed vessel to maintain the pressure substantially constant in the vessel and to replenish oxygen as used in the process of converting the free oxides present to nitric acid, and regulating the rate of supply of said aqueous liquid to conform the velocity of flow thereof to that of the oxygen gas whereby total conversion and absorption of said oxides continuously results.

2. A process according to claim 1 in which the aqueous liquid is selected from the group consisting of water, lime water, nitric acid, silver nitrate, and caustic alkali.

3. A process according to claim 1 in which the oxygen gas is caused to impinge on the entering aqueous liquid to form a spray.

4. A process for effecting total absorption of the nitrogen oxide fumes as in claim 1 wherein the material in the column is nodular material.

5. A process according to claim 4 in which the nodular material consists of coarse grained quartz.

6. A process according to claim 4 in which the nodular material is heated initially to a temperature of about 65° C.

7. In the manufacture of the nitrate of a metal selected from the group consisting of silver and bismuth by the reaction of the selected metal with nitric acid, the improvement which comprises arranging the metal in a closed column in fragmentary form presenting large surface areas for contact, displacing air from said column, introducing nitric acid and a gas consisting substantially entirely of oxygen gradually freely downwardly over said large surface areas, in the absence of air and at substantially atmospheric pressure, the rate of travel of said acid being adapted to allow reaction between the acid and unreacted metal at each successive stage of its progress over the surfaces of the metal with the evolution of nitrogen oxide fumes, whereby the major portion of the acid is directly utilized in the formation of the nitrate; regulating the supply of oxygen to maintain in the reaction zone at least the amount required to convert to nitric acid any free nitrogen oxides present, the nitric acid so produced being available to react with the metal, whereby substantially the whole of the original acid is converted into nitrate; and continuously collecting the nitrate solution formed, out of contact with the metal.

8. A process according to claim 7 in which the column of metal is in nodular form.

9. A process according to claim 7 in which the metal column is heated initially to a temperature between 65° C. and 100° C.

10. A process according to claim 7 in which the entering oxygen is caused to impinge on the entering nitric acid and forms the latter into a spray.

THOMAS CRITCHLEY.

REFERENCES CITED

The following references are of record in the file of this patent:

UNITED STATES PATENTS

| Number | Name | Date |
|---|---|---|
| 475,575 | Lawton | May 24, 1892 |
| 993,868 | Pauling | May 30, 1911 |
| 1,013,984 | Bosch et al. | Jan. 9, 1912 |
| 1,180,964 | Auger | Apr. 25, 1916 |
| 2,013,984 | Gross | Sept. 10, 1935 |
| 2,147,161 | Haglund | Feb. 14, 1939 |
| 2,206,495 | Beardsley | July 2, 1940 |

OTHER REFERENCES

Chemical and Metallurgical Engineering, vol. 53, No. 8, pp. 113–115 (August 1946).

Mellor: "A Comprehensive Treatise of Inorganic and Theoretical Chemistry," vol. 3, p. 459; London, Longmans, Green & Co. (1923).